（12）United States Patent
Ihara et al.

(10) Patent No.: US 7,965,871 B2
(45) Date of Patent: Jun. 21, 2011

(54) MOVING-STATE DETERMINING DEVICE (75) Inventors: Toru Ihara, Kawasaki (JP); Keiichi Yamamoto, Kawasaki (JP); Tomoaki Teshima, Yokohama (JP); Hideo Saito, Yokohama (JP); Shinji Ozawa, Yokohama (JP)

(73) Assignees: Mitsubishi Fuso Truck and Bus Corporation, Kanagawa (JP); Keio University, Tokyo (JP)

( * ) Notice: Subject to any disclaimer, the term of this patent is extended or adjusted under 35 U.S.C. 154(b) by 1011 days.

(21) Appl. No.: 11/826,265

(22) Filed: Jul. 13, 2007

(65) Prior Publication Data
US 2008/0013790 A1  Jan. 17, 2008

(30) Foreign Application Priority Data
Jul. 13, 2006 (JP) .................................. 2006-192812

(51) Int. Cl.
*G06K 9/00* (2006.01)
(52) U.S. Cl. .............................. 382/107; 348/144; 701/1
(58) Field of Classification Search .................. 382/100, 382/103, 104, 106, 107; 348/113, 118, 119, 348/120, 143, 144, 169–172; 701/1, 10, 701/200
See application file for complete search history.

(56) References Cited

U.S. PATENT DOCUMENTS

| 5,638,116 | A | * | 6/1997 | Shimoura et al. | 348/118 |
| 5,739,848 | A | * | 4/1998 | Shimoura et al. | 348/119 |
| 5,892,855 | A | * | 4/1999 | Kakinami et al. | 382/291 |
| 7,152,000 | B2 | * | 12/2006 | Ihara et al. | 701/301 |
| 2005/0031169 | A1 | | 2/2005 | Shulman et al. | |
| 2006/0239509 | A1 | * | 10/2006 | Saito | 382/104 |

FOREIGN PATENT DOCUMENTS

| EP | 1 623 875 A1 | 2/2006 |
| JP | 2005-267384 | 9/2005 |
| JP | 2006-258936 | 9/2005 |
| JP | 2005-284339 | 10/2005 |

* cited by examiner

*Primary Examiner* — Anand Bhatnagar
(74) *Attorney, Agent, or Firm* — Jacobson Holman PLLC (57) ABSTRACT

A moving-state determining device acquires a first overhead image from a bird's-eye image obtained at first image pickup timing and acquires a second overhead image, which can be regarded as the same road surface area as that of the first overhead image, for each of moving directions assumed for the moving body from a bird's-eye image obtained at second image pickup timing different from the first image pickup timing by a predetermined time period. The device compares a degree of similarity between the first overhead image and each of a plurality of second overhead images to acquire the second overhead image with the largest similarity degree as the same road surface area as that of the first overhead image. The device acquires the moving direction and a lateral displacement amount in the moving from a coordinate conversion condition based on which the second overhead image has been obtained.

9 Claims, 7 Drawing Sheets

MOVING-STATE DETERMINING DEVICE

BACKGROUND OF THE INVENTION

1. Field of the Invention

The present invention relates to a moving-state determining device suitable for detection of meandering of a vehicle from an image of a road in front of the vehicle in the vehicle moving direction picked up by a camera mounted on the vehicle, for example.

2. Description of the Related Art

As a technology for detecting meandering of a vehicle from an image of a road in front of the vehicle in the vehicle moving direction picked up by a camera mounted on the vehicle, such a technology is proposed that a white line as a lane marker laid on the road is detected and the position of the vehicle is acquired from information of the white line. This technology is disclosed in Japanese Unexamined Patent Publication No. 2005-267384 (Patent Document 1), Japanese Unexamined Patent Publication No. 2005-258936 (Patent Document 2), and Japanese Unexamined Patent Publication No. 2005-284339 (Patent Document 3), for example. Also, a technology for detection of drowsiness state of a driver from the meandering state of the vehicle and issue of an alarm to prevent drowsy driving is proposed.

However, in the case of driving on a snowy road or non-paved road, it is difficult to detect a white line from the road image. Thus, in this case, since a white-line position as an index to detect the position of the vehicle can not be identified, meandering can not be detected, which is a problem. Particularly, the road image in front of the vehicle in the vehicle moving direction picked up by a camera mounted on a vehicle can be easily varied by being affected by a vehicle tilting such as an inclination in the vehicle moving direction (yaw angle $\theta$) or in the longitudinal direction (pitch angle $\phi$). Thus, when the white line as the above-mentioned index can not be detected, its image processing itself becomes impossible.

SUMMARY OF THE INVENTION

An aspect of the present invention is directed to a moving-state determining device, comprising: a camera mounted on a moving body for obtaining a bird's-eye image by picking up a road surface on which the moving body moves from diagonally upward; coordinate converting means for coordinate-converting the bird's-eye image to acquire an overhead image viewing the road surface from right above; bird's-eye image obtaining means for obtaining a first bird's-eye image picked up by the camera at a first image pickup timing and a second bird's-eye image picked up by the camera at a second image pickup timing different from the first image pickup timing by a predetermined time period; overhead image obtaining means which obtains a first overhead image from the first bird's-eye image using the coordinate converting means, assumes a plurality of changes in the moving state of the moving body on the road surface during the predetermined time period and obtains a plurality of second overhead images that can be regarded as the same road surface area as that of the first overhead image based on the assumed changes in the moving state of the moving body and the second bird's-eye image; and moving-state change calculating means which calculates a degree of similarity between the first overhead image and each of the plurality of second overhead images, and compares the degrees of similarity to each other to obtain most probable change in the moving state of the moving body from the assumed change based on which the second overhead image with the largest degree of similarity is obtained.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

A moving-state determining device according to an embodiment of the present invention will be described below referring to the attached drawings. Specifically, an example will be described that an image of a road in front of the vehicle in the vehicle moving direction is picked up by means of a camera mounted on a vehicle, and a lateral displacement amount in the width direction (direction perpendicular to the vehicle moving direction) of the vehicle is detected from a picked-up road image.

Figure 1:
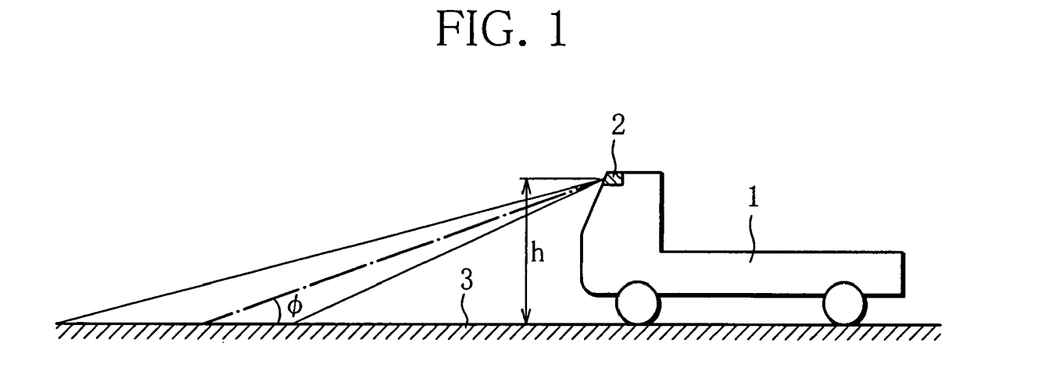
FIG. 1 is a schematic view illustrating a relation between a camera mounted on a vehicle and a road surface in front of the vehicle in the vehicle moving direction which is picked up by the camera.

FIG. 1 illustrates a relation between a camera 2 mounted on a vehicle (truck) 1 and an image pickup area of a road 3 in front of the vehicle in the vehicle moving direction which is picked up by this camera 2. The camera 2 is fixed at a position above a driver's seat in the vehicle 1, for example. This camera 2 has its optical axis adjusted so that the road 3 in the moving direction of the vehicle 1 is viewed from diagonally above at a predetermined angle. The road image in front of the vehicle in the vehicle moving direction picked up by the camera 2 (camera image) is a so-called bird's-eye image in perspective with an angle made by the optical axis of the camera 2 from the position at a height h and the surface of the road 3, that is, an inclination $\phi$ being constant.

Figure 2:
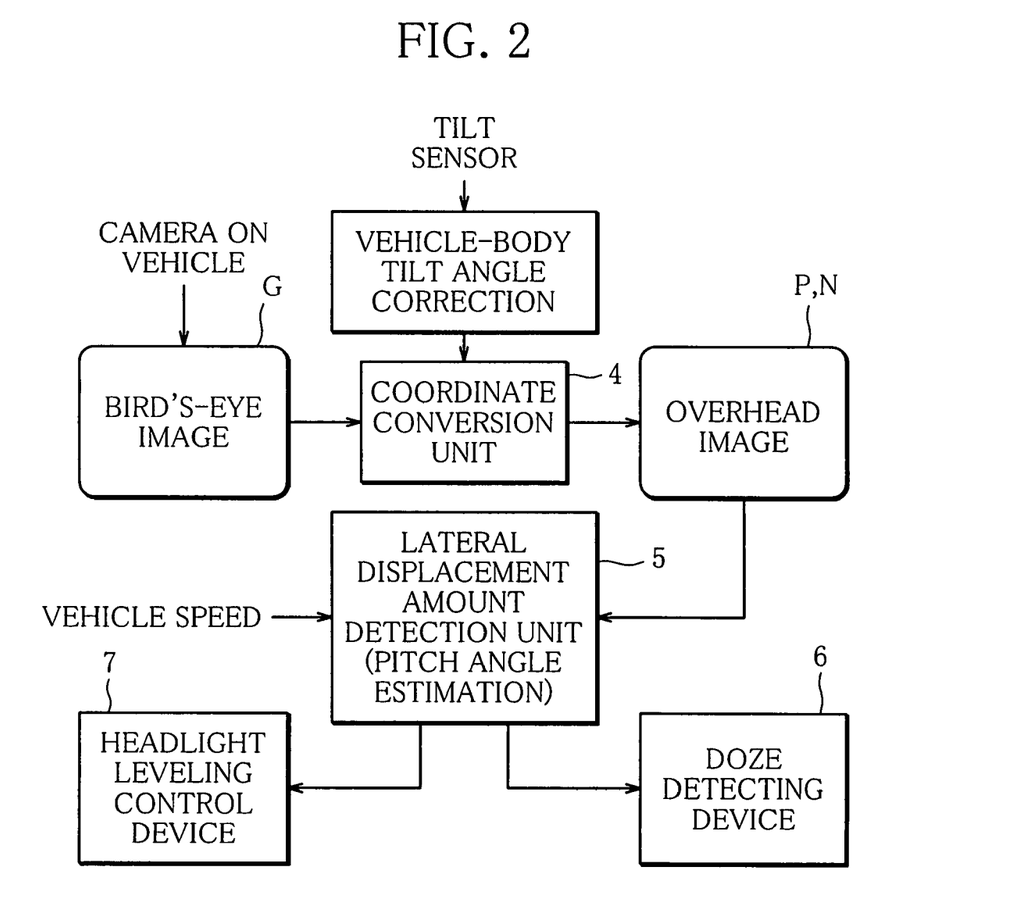
FIG. 2 is a block diagram illustrating a basic configuration of a moving-state determining device according to an embodiment of the present invention.

FIG. 2 shows a basic configuration of the moving-state determining device. As shown in FIG. 2, the moving-state determining device is provided with a coordinate conversion unit 4 and a lateral displacement amount detection unit 5. The coordinate conversion unit 4 carries out coordinate conversion, as will be described later, of a bird's-eye image G obtained from the camera 2 so as to acquire overhead images P, N viewing the road 3 from right above. The lateral displacement amount detection unit 5 calculates a degree of similarity between the overhead images P, N acquired from a plurality of bird's-eye images that are obtained at different image pickup timings as will be described later so as to detect the moving direction θ of the vehicle 1 and a lateral displacement amount W. Particularly, the lateral displacement amount detection unit 5 calculates the degree of similarity between the first overhead image P at reference timing and each of a plurality of second overhead images N acquired according to the moving direction of the vehicle 1, respectively. The lateral displacement amount detection unit 5 compares the similarity degrees to each other so as to obtain a second overhead image N showing the same road surface area as that of the first overhead image P and detects the moving direction θ of the vehicle 1 and the lateral displacement amount W from information of the coordinate conversion by which the second overhead image N was acquired.

When a tilt sensor (not shown) for detecting an inclination of the vehicle 1 is mounted on the vehicle 1, a tilt angle correction for a coordinate conversion equation used in the above-mentioned coordinate conversion unit 4 may be carried out according to an inclination attitude detected using the sensor. By acquiring the overhead images P, N, respectively, from the above-mentioned bird's-eye image G with such a tilt angle correction of the vehicle 1, its conversion accuracy can be improved. Therefore, more accurate detection of the lateral displacement amount of the vehicle 1 and thus, more accurate detection of a curve amount and a meandering amount are realized. The lateral displacement amount, curve amount, and meandering amount will be described later.

The lateral displacement amount of the vehicle 1 detected by the lateral displacement amount detection unit 5 is given to a doze detecting device 6 and used for determination of a degree of drowsiness of a driver of the vehicle 1, for example. Detailed explanation of the doze detecting device 6 is omitted, but the doze detecting device 6 determines (estimates) a drop in attention on driving of the driver from the meandering state of the vehicle 1, and when the driver feels sleepy, that is, the driver's attention is detected to be lowered, an alarm is issued. Also, if an inclination in the longitudinal direction (pitch angle) of the vehicle 1 is detected by the lateral displacement amount detection unit 5 as will be described later, the information of the inclination is given to a headlight leveling control device 7 and used for angle control of the illumination direction of a headlight (not shown), that is, automatic adjustment of an upward angle of the headlight.

Figure 3:
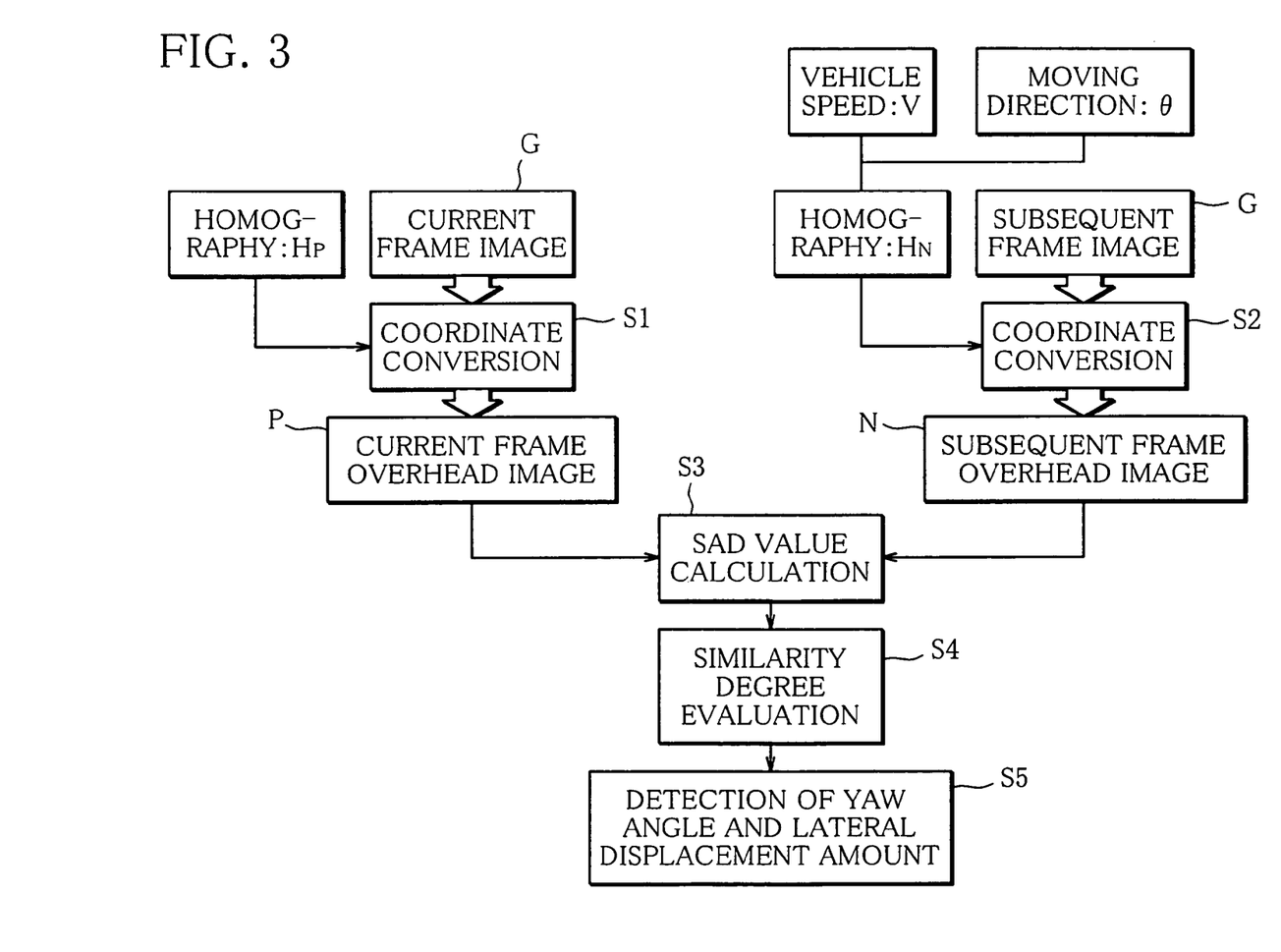
FIG. 3 is a block diagram illustrating a schematic processing procedure of lateral displacement amount detection by the moving-state determining device shown in FIG. 2.

FIG. 3 shows a schematic processing procedure of lateral displacement amount detection by the moving-state determining device basically comprising the coordinate conversion unit 4 and the lateral displacement amount detection unit 5 as mentioned above. In this moving-state determining device, from a frame image (bird's-eye image) of the camera 2 that picks up road images continuously with a frame cycle of 1/30 second, for example, respective frame images (bird's-eye images) are acquired at a first image pickup timing to be a reference for the lateral displacement amount detection and a second image pickup timing after a predetermined time period from the first image pickup timing. Specifically, a current frame image and a subsequent frame image are acquired as a frame image at first and second image pickup timings, respectively. The moving-state determining device acquires a first overhead image P and a second overhead image N from the current frame image and the subsequent frame image.

Generation of the first overhead image P from the current frame image is carried out by coordinate conversion of the current frame image (bird's-eye image) according to a homography $H_P$ showing a relation between the bird's-eye image and the overhead image [Step S1]. The homography $H_P$ is determined by the above-mentioned mounting height h of the camera 2 and an inclination viewing the road 3 (angle made by the optical axis of the camera 2 and the road surface) φ, and represented by the following equation (1):

$$H_P = A \begin{pmatrix} 1 & 0 & 0 \\ 0 & \sin\phi & h\cos\phi \\ 0 & \cos\phi & h\sin\phi \end{pmatrix} \quad (1)$$

Figure 4:
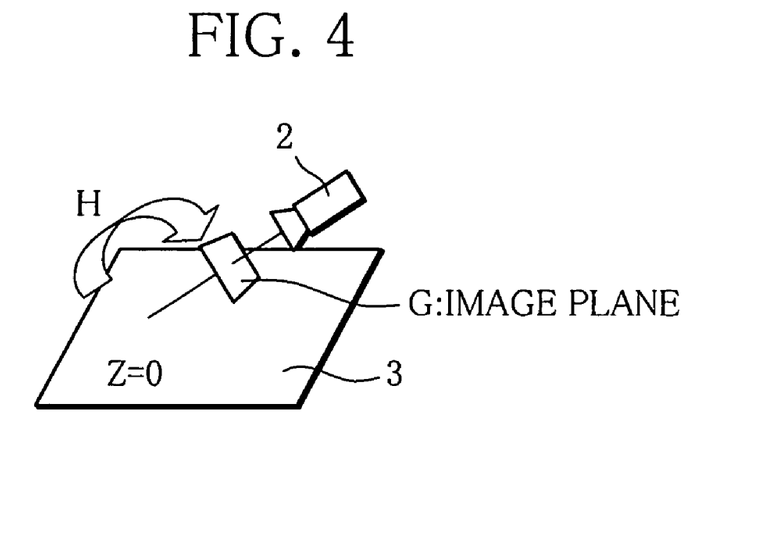
FIG. 4 is a view illustrating a concept of coordinate conversion to obtain an overhead image from a bird's-eye image.
Figure 5:
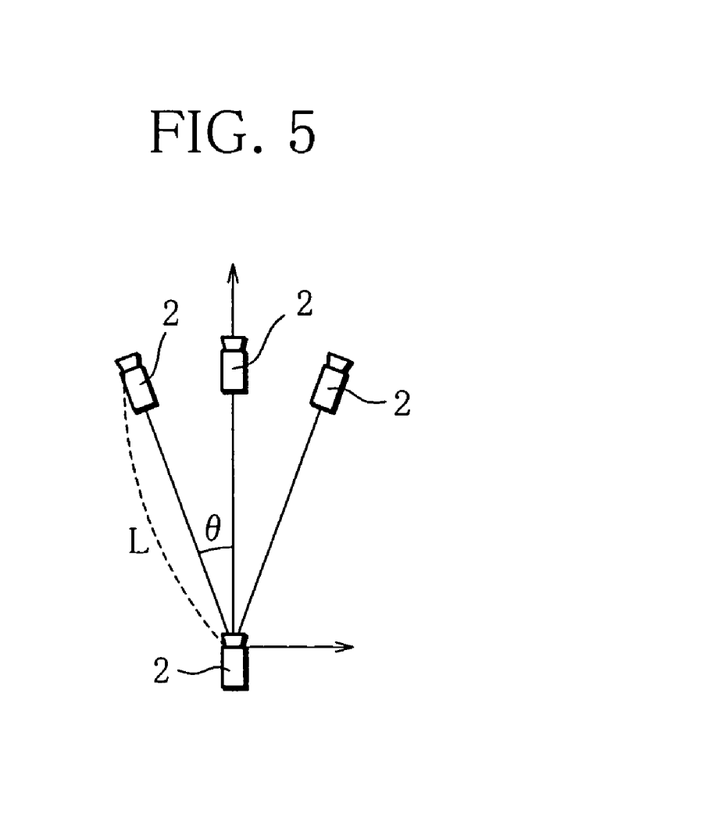
FIG. 5 is a diagram illustrating a relation between an orientation of the camera and the moving direction of a vehicle at first and second pickup timing.

The homography $H_P$ is a matrix representing a one-to-one correspondence of coordinates obtained between two planes or its relation. Therefore, if the road 3 is considered to be a plane as shown in FIG. 4, the road surface can be captured by homography $H_P$ as an image projected on an image plane corresponding to a camera image. Thus, if a geometric positional relation between these two planes is acquired in advance as homography $H_P$, an overhead image showing a plane image of the road 3 can be easily acquired from a frame image (bird's-eye image) using the homography $H_P$.

Also, generation of the second overhead image N from the subsequent frame image is carried out by coordinate conversion of the subsequent frame image according to homography $H_N$ [Step S2]. The homography $H_N$ is determined by, in addition to the above-mentioned camera mounting height h and the inclination viewing the road (angle made by the optical axis of the camera 2 and the road surface) 4, a distance L moved by the vehicle 1 in a time difference (predetermined time period) between the current frame image and the subsequent frame image and the moving direction of the vehicle 1 assumed in advance, more specifically, a yaw angle θ indicating the direction of the vehicle 1, and represented by the following equation (2):

$$H_N = A \begin{pmatrix} \cos\theta & \sin\theta & L\sin\theta \\ -\sin\phi\sin\theta & \sin\phi\cos\theta & h\cos\phi + L\cos\phi\sin\theta \\ -\cos\phi\sin\theta & \cos\phi\cos\theta & h\sin\phi + L\cos\theta\cos\phi \end{pmatrix} \quad (2)$$

The distance L moved by the vehicle 1 is acquired from a vehicle speed V detected by a speed sensor (not shown) and a time difference (predetermined time period) between the above frame images. Here, it is assumed that the vehicle 1 is running on a plane and the height h of the camera 2 is not changed. Also, it is assumed that rotation of the camera 2 is generated integrally with change in the direction of the vehicle 2 and its optical axis accords with the moving direction indicated by the direction of the vehicle 1 all the time. Moreover, the moving direction (yaw angle θ) of the vehicle 1 is assumed using a plurality of yaw angles θ set every predetermined angle, for example, as the direction of the vehicle 1 (orientation of the camera 2) which can vary in the time difference (predetermined time period). Therefore, the second overhead image N is obtained in plural according to the assumed directions of the vehicle (yaw angle θ) as its concept shown in FIG. 6.

Figure 6:
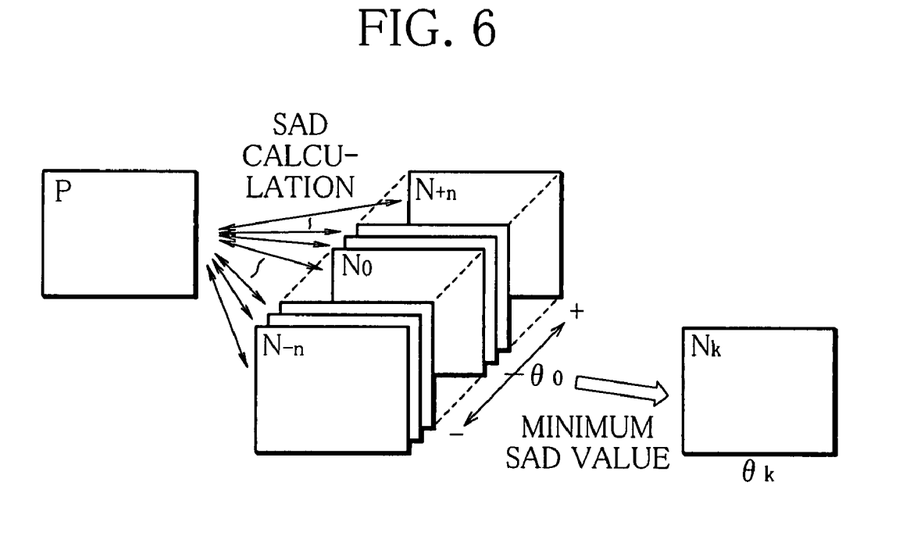
FIG. 6 is a conceptual diagram illustrating a process for determining the vehicle moving direction by similarity degree calculation between a first overhead image and each of a plurality of second overhead images.

The similarity degree between each of these plurality of second overhead images $N_{-n}, \ldots, N_0, \ldots, N_{+n}$ and the first overhead image P is calculated as a sum of an absolute value of differences (SAD) between the images, for example [Step S3]. Moreover, by comparing these similarity degrees (value of SAD) to each other, the second overhead image $N_k$ with the largest similarity degree, that is, the second overhead image $N_k$ with the smallest value of SAD is acquired as indicating the same road surface area as that of the above first overhead image P [Step S4].

That is, when the direction of the vehicle 1 that has moved the distance L accords with the direction of the vehicle 1 assumed as above, the road surface area of the second overhead image N obtained by coordinate conversion based on the yaw angle θ (direction of the vehicle 1) and the road surface area of the first overhead image P become equal to each other. However, if the assumed direction of the vehicle 1 differs from the actual direction of the vehicle 1, the road surface area of the second overhead image N obtained for the assumed direction is displaced in the width direction as compared with the road surface area of the first overhead image P. As the angle between the assumed direction of the vehicle 1 and the actual direction of the vehicle 1 gets larger, the difference between the road surface areas becomes larger, and the difference between the overhead images is remarkable.

Therefore, by acquiring the second overhead image $N_k$ with the highest similarity degree with respect to the first overhead image P, the direction of the vehicle 1 can be accurately acquired from the coordinate conversion condition used for generation of the second overhead image $N_k$, that is, the yaw angle θ introduced into the above-mentioned homography $H_N$. When the direction of the vehicle 1 (yaw angle θ) is obtained in this way, a displacement amount W in the width direction of the vehicle 1 after the vehicle 1 has moved the distance L in that direction can be calculated as W=L·sinθ, for example [Step S5].

In this way, the moving-state determining device acquires the direction of the vehicle 1 (yaw angle θ) as described above from the similarity degree between the first and the second overhead images P, N after the vehicle 1 has moved the distance L, and further acquires its lateral displacement amount W. According to the moving-state determining device, even if an index such as a white line can not be detected from a camera image (bird's-eye view) that has been obtained by picking up the road 3, that is, even in the case of moving on a snowy road or an unpaved road, for example, the lateral displacement amount of the vehicle 1 can be accurately detected from entire image information provided by the road image based on the yaw angle θ of the vehicle 1. Therefore, since it is not necessary to detect the index such as a white line from the camera image, control using the lateral displacement amount of the vehicle 1 can be executed stably all the time without being affected by the road environment.

Figure 9:
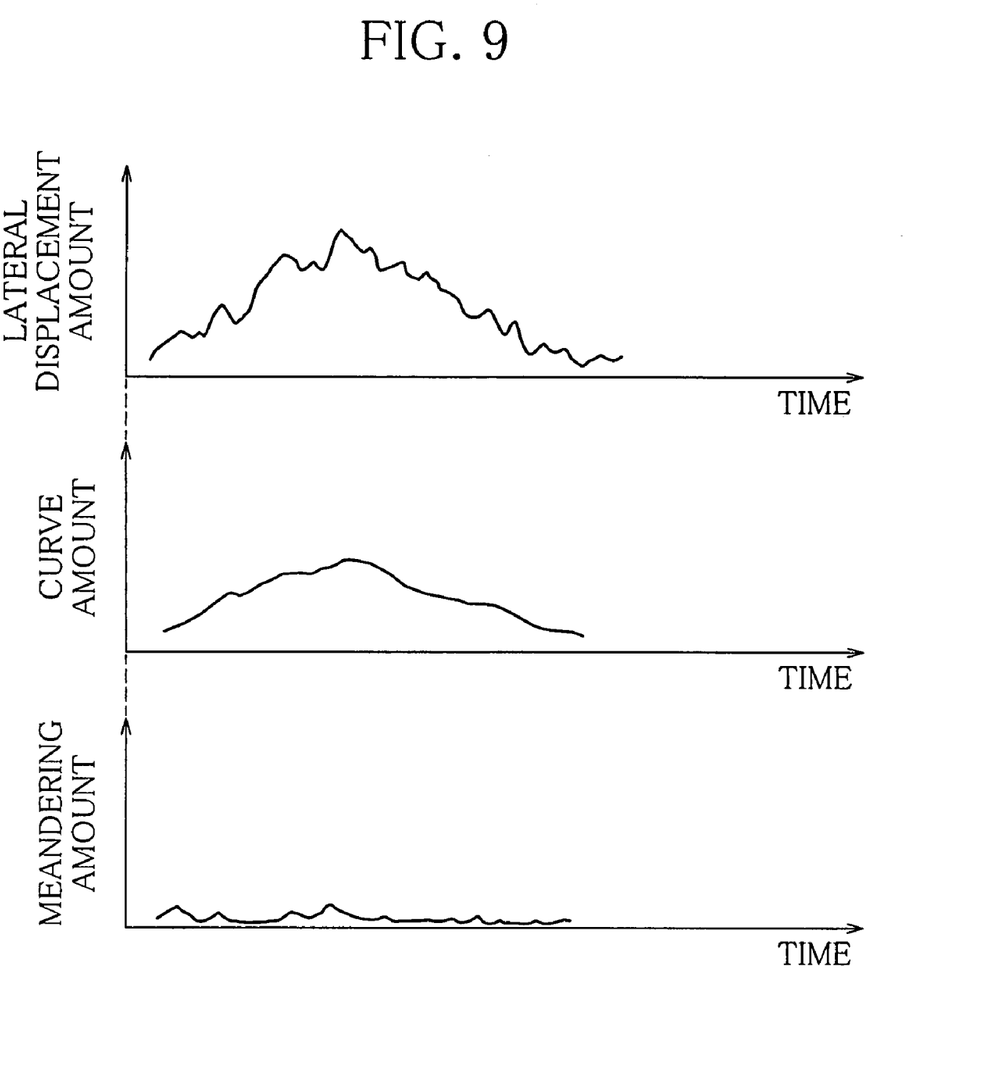
FIG. 9 is a graph illustrating a relation of a lateral displacement amount, a curve amount and a meandering amount.

By extracting a predetermined low-frequency component from the lateral displacement amount W detected as shown in the upper column in FIG. 9, for example, a curve amount of the road on which the vehicle 1 is moving can be acquired as shown in the middle column in FIG. 9. Based on the curve amount, the optical axis of the headlamp of the vehicle 1 can be controlled in the right/left direction according to the curve amount. Also, by extracting a predetermined high-frequency component from the lateral displacement amount W, a meandering amount of the vehicle 1 can be acquired as shown in the lower column in FIG. 9. Based on the meandering amount, drop in attention of the driver of the vehicle 1 (drowsiness) can be detected and an alarm can be issued when the attention is lowered.

Figure 7:
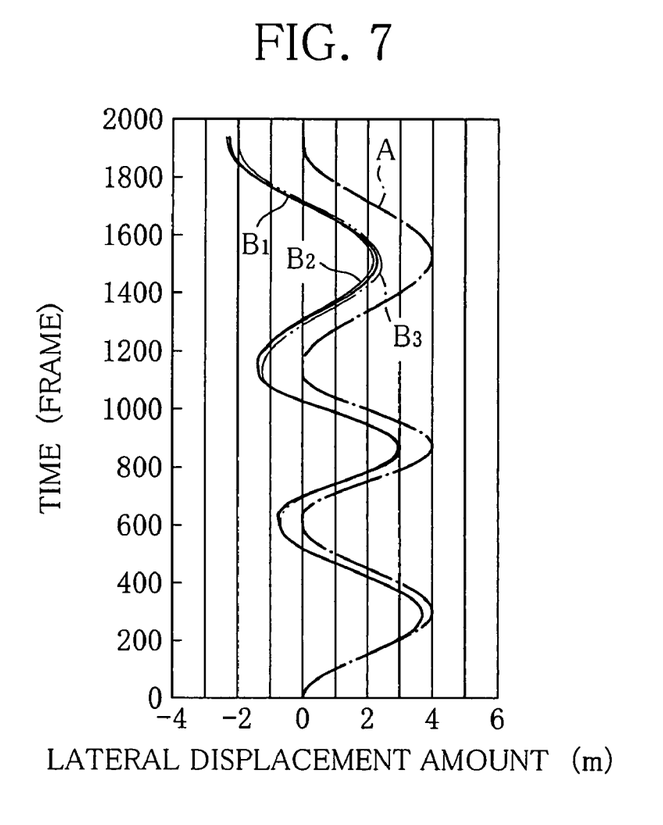
FIG. 7 is a graph illustrating a simulation result using a composite image.

FIG. 7 shows a simulation result of lateral displacement detection by the device with the mounting height h of the camera 2 at 2.0 m and its inclination at 8.31° using a composite image created by computer graphics. In FIG. 7, a curve A shows a meandering pattern set in advance, B1 shows a meandering detection result acquired from the composite image forming a road surface to which a texture of an uneven pattern is applied, B2 shows a meandering detection result acquired from a composite image obtained by adding a guard rail to the road surface, and B3 shows a meandering detection result acquired from a composite image obtained by adding a white line and a guard rail to the road surface.

According to these experimental results, as more time elapses since a reference frame is obtained, the difference between a meandering detection result and a meandering pattern A set in advance gets larger, but it has been found that the lateral displacement amount (curve amount, meandering amount) can be detected accurately, regardless of presence of the white line or guard rail in the composite image. The reason for the increase of the difference between the meandering detection result and the meandering pattern A is considered that position difference (error due to low-frequency noise) between the first overhead image and the second overhead image is accumulating with progress of the vehicle 1, as more time elapses since a reference frame is obtained.

Therefore, in the case of the frame image with the frame cycle of 1/30 second, the lateral displacement amount can be detected with accuracy of 1.2 mm or less per frame (0.7 mm in standard), for example. Therefore, by setting a time difference between an acquisition time of a frame image to obtain the first overhead image and an acquisition time of a frame image to obtain the second overhead image is set approximately at 300 frames (10 seconds), the lateral displacement amount of the vehicle 1 can be detected with accuracy in a range causing no problem in practice. Also, in meandering detection, since amplitude of the lateral displacement is mainly evaluated, a detection error mentioned above in the displacement amount causes little problem in actuality. However, if a low-frequency noise causing the increase in the difference between the meandering detection result and the meandering pattern A is to be eliminated, measures may be taken such as use of a frequency band filter or reduction in the evaluation section.

Figure 8A:
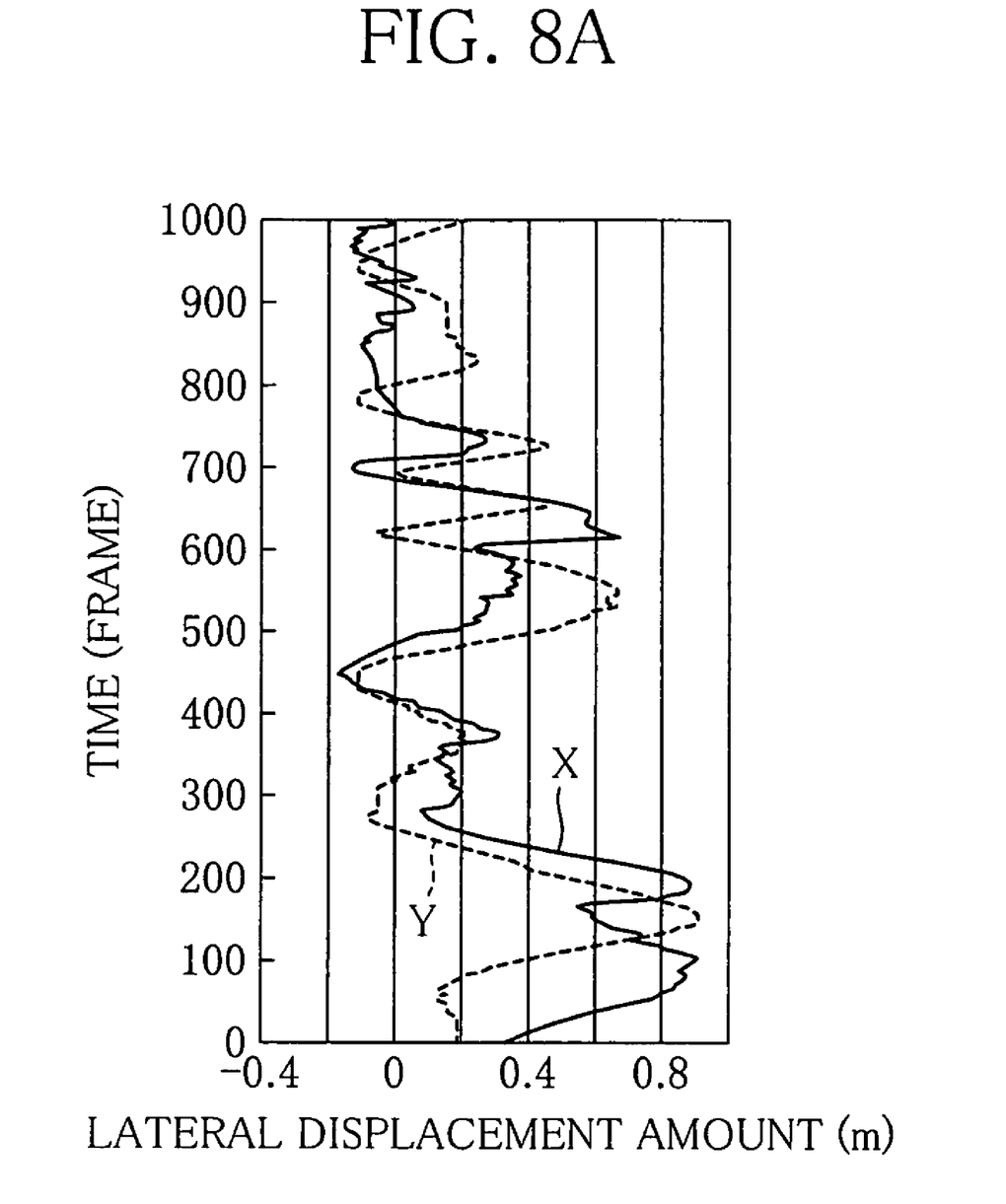
FIG. 8A is a graph illustrating an experimental result using an actual image obtained from a moving vehicle on a highway.
Figure 8B:
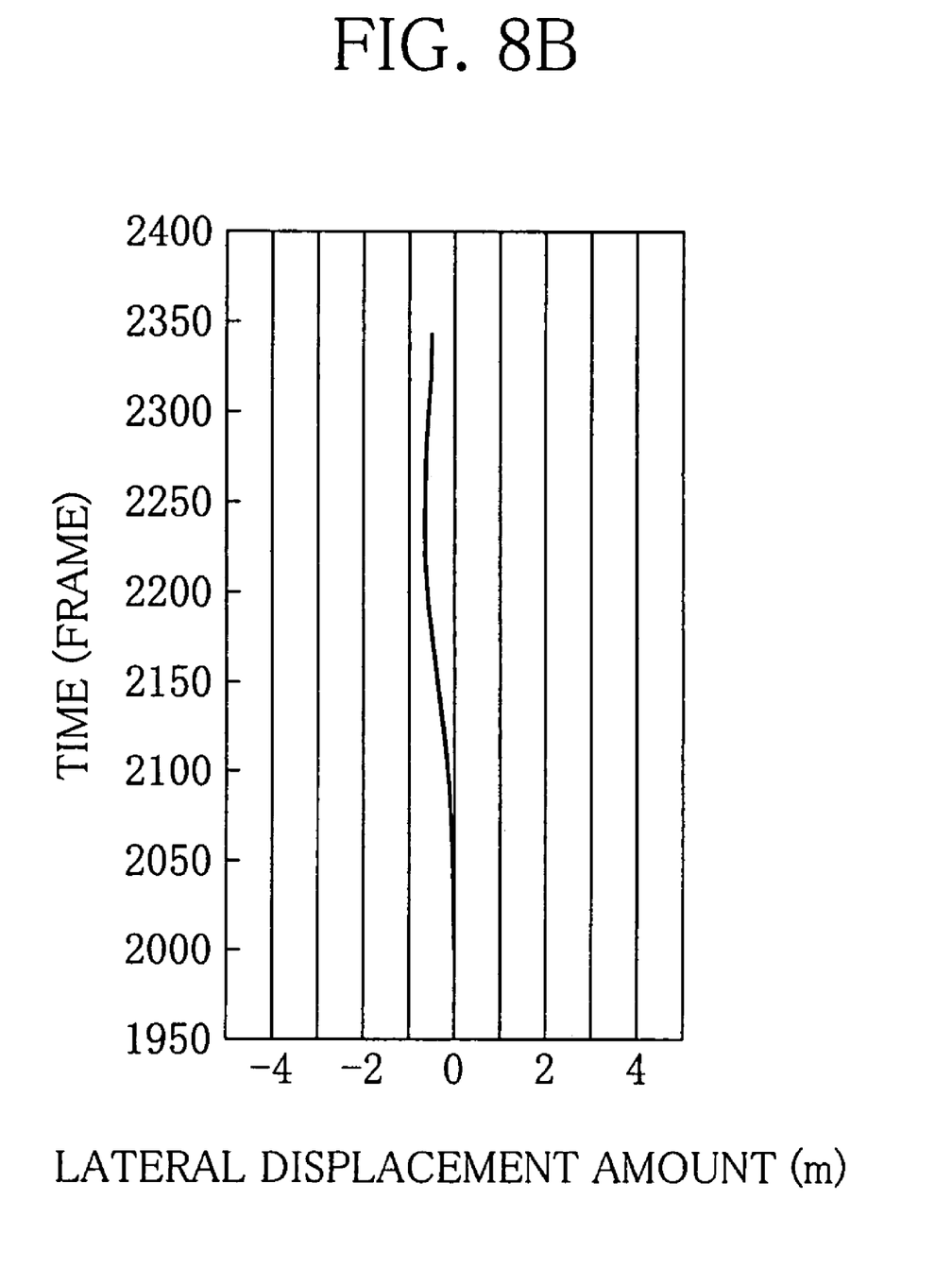
FIG. 8B is a graph illustrating an experimental result using an actual image obtained from a moving vehicle on a snowy road.

FIGS. 8A and 8B show experimental results using an actual image picked up by the camera 2 mounted on the vehicle 1. FIG. 8A shows a conventional meandering amount detection result (broken line Y) using a white line acquired from a camera image during highway driving and a meandering detection result (solid line X) by this device in comparison. FIG. 8B shows a meandering detection result acquired by this device based on a camera image during straight driving on a snowy road. From the experimental result on the highway, the lateral displacement amount detected by the device has an average error of 207 mm and a standard deviation of 158 mm as compared with the lateral displacement detection using a white line, but the detected value is approximately close to a true value in terms of follow-up of a horizontal position. Also, from the experimental result on a snowy road, a locus of the vehicle 1 which can be regarded as straight driving is estimated substantially favorably, and its average error is 335 mm and a standard deviation is 231 mm. Therefore, from this experimental result, usability of this device can be sufficiently confirmed.

In the above-mentioned processing, the similarity degree between the second overhead image N acquired for an assumed yaw angle θ and the first overhead image P is actually evaluated, and this evaluation of similarity is repeated with the assumed yaw angle θ being changed. Thus, by changing a variable width of the yaw angle θ and a variable amount Δθ, the calculation cost (calculation processing time per frame) can be reduced. Particularly, since a steering angle of a steering wheel is small in moving on a highway, the variable width of the yaw angle θ (search width of θ) can be narrowed. The following table shows an example of the calculation processing time per frame when the variable width of the yaw angle θ and the variable amount Δθ are changed:

| Δθ | 0.1° | 0.05° | 0.025° |
|---|---|---|---|
| −0.5° ≦ θ ≦ 0.5° | 0.18 sec | 0.25 sec | 0.29 sec |
| −1.0° ≦ θ ≦ 1.0° | 0.32 sec | 0.52 sec | — |
| −2.0° ≦ θ ≦ 2.0° | 0.61 sec | 1.85 sec | — |
| −5.0° ≦ θ ≦ 5.0° | — | 2.41 sec | — |

Therefore, in highway driving, for example, if the moving direction (yaw angle θ) of the vehicle 1 is searched with [Δθ=0.05°] in a range of [−0.5°≦θ≦0.5°], considering that the steering angle of the steering wheel is small, the calculation processing time is [0.25 second] per frame. As a result, it becomes possible to detect a lateral displacement amount, thus, meandering of the vehicle 1 substantially without time delay. Particularly, in the case where the similarity degree between the frame images (bird's-eye image) is directly calculated, it takes a large processing time for image correction considering the moving distance L of the vehicle 1 between frame images. Therefore, the lateral displacement amount detection by this device is extremely excellent in terms of its processing burden (processing time).

In the above explanation, the direction of the vehicle 1 (yaw angle θ) is searched by assuming the direction of the vehicle 1 (yaw angle θ) after a predetermined time period and acquiring the second overhead image N, but a pitch angle φ, which is the longitudinal inclination of the vehicle 1, may be searched at the same time. In this case, the direction of the vehicle 1 (yaw angle θ) after the predetermined time period is assumed and its pitch angle φ is assumed at the same time, and the second overhead images according to the combination of the assumed yaw angle θ and the pitch angle φ may be acquired, respectively. In this case, an angle made by the image pickup optical axis of the camera 2 and the road surface is given by the above-mentioned inclination φ determined by the mounting angle of the camera 2 with the above pitch angle φ being added. Therefore, the homography $H_N$ acquiring the second overhead image can be obtained as in the following equation (3):

$$H_N = A \begin{pmatrix} \cos\theta & \sin\theta & L\sin\theta \\ -\sin(\phi+\varphi)\sin\theta & \sin(\phi+\varphi)\cos\theta & h\cos(\phi+\varphi) + L\cos\theta\sin\phi \\ -\cos(\phi+\varphi)\sin\theta & \cos(\phi+\varphi)\cos\theta & h\sin(\phi+\varphi) + L\cos\theta\cos\phi \end{pmatrix} \quad (3)$$

By calculating the similarity degree (SAD value) between each of the plurality of second overhead images N acquired by the homography $H_N$ in the above equation (3) and the first overhead image P and by acquiring the second overhead image N having the highest similarity degree and indicating the same road surface area as that of the first overhead image P, the yaw angle θ indicating the direction of the vehicle 1 and the pitch angle φ indicating the inclination of the vehicle 1 can be acquired, respectively, from the above-mentioned homography $H_N$, which is the coordinate conversion condition to acquire the second overhead image N having the highest similarity degree. Therefore, by acquiring an average inclination of the vehicle 1 from the pitch angle φ obtained as above, the true inclination angle (pitch angle φ) in the longitudinal direction of the vehicle 1 can be estimated without providing an exclusive pitch angle sensor. By this, information of the inclination angle (pitch angle φ) in the longitudinal direction of the vehicle 1 is given to the headlamp leveling control device 7 incorporated in the vehicle 1, for example, so that the illumination direction of the headlamp (not shown), that is, an upward angle can be automatically adjusted. Particularly when the vehicle 1 is a truck, since the vehicle tilt (inclination in the longitudinal direction) is varied by its loaded weight, the information of the inclination angle (pitch angle φ) can be effectively utilized for the control by the headlamp leveling control device 7.

The present invention is not limited to the above-mentioned embodiment. For example, the variable width of the yaw angle θ and its variable amount Δθ may be changed according to the running condition or the like of the vehicle 1 or determined according to an image resolution of the camera 1. Also, meandering detection of the vehicle (truck) 1 is explained here as an example, but it may be incorporated in a general passenger car or may be used for meandering detection of an automatic running robot. Moreover, it is needless to say that the lateral displacement amount can be similarly detected not from the road image in front of the vehicle in the vehicle moving direction but from the road image in the rear in the vehicle moving direction. The present invention may be put into practice with various variations in a range not departing from its substance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A moving-state determining device, comprising:
a camera mounted on a moving body for obtaining a bird's-eye image by picking up a road surface on which the moving body moves from diagonally upward;
coordinate converting means for coordinate-converting the bird's-eye image to acquire an overhead image viewing the road surface from right above;
bird's-eye image obtaining means for obtaining a first bird's-eye image picked up by the camera at a first image pickup timing and a second bird's-eye image picked up by the camera at a second image pickup timing different from the first image pickup timing by a predetermined time period;
overhead image obtaining means which obtains a first overhead image from the first bird's-eye image using the coordinate converting means, assumes a plurality of changes in the moving state of the moving body on the road surface during the predetermined time period and obtains a plurality of second overhead images that can be regarded as the same road surface area as that of the first overhead image based on the assumed changes in the moving state of the moving body and the second bird's-eye image; and
moving-state change calculating means which calculates a degree of similarity between the first overhead image and each of the plurality of second overhead images, and compares the degrees of similarity to each other to obtain most probable change in the moving state of the moving body from the assumed change based on which the second overhead image with the largest degree of similarity is obtained.

2. The moving-state determining device according to claim 1,
wherein said degree of similarity between the first overhead image and the second overhead image is obtained by calculating a sum of absolute values of differences between the overhead images, and
said second overhead image with the largest degree of similarity with respect to the first overhead image is the second overhead image with the smallest value of the sum of the absolute value of the differences.

3. The moving-state determining device according to claim 1,
wherein said coordinate converting means regards the road surface on which the moving body moves as a plane and converts the bird's-eye image to the overhead image using homography H indicating a geometric positional relation between a camera image obtained by picking up an image of the road surface at a given inclination $\phi$ from a given height h and the road surface,
wherein homography $H_P$ which is used for obtaining the first overhead image and homography $H_N$ which is used for obtaining the second overhead image are acquired by the following equation with a moving distance of the moving body during the predetermined time period as L and a moving direction of the moving body as yaw angle $\theta$, when its internal parameter matrix A is known:

$$H_P = A \begin{pmatrix} 1 & 0 & 0 \\ 0 & \sin\phi & h\cos\phi \\ 0 & \cos\phi & h\sin\phi \end{pmatrix}$$

$$H_N = A \begin{pmatrix} \cos\theta & \sin\theta & L\sin\theta \\ -\sin\phi\sin\theta & \sin\phi\cos\theta & h\cos\phi + L\cos\theta\sin\phi \\ -\cos\phi\sin\theta & \cos\phi\cos\theta & h\sin\phi + L\cos\theta\cos\phi \end{pmatrix}.$$

4. The moving-state determining device according to claim 3,
wherein said moving distance L of the moving body during the predetermined time period is obtained from a moving speed of the moving body measured by a speed sensor.

5. The moving-state determining device according to claim 1,
wherein said overhead image obtaining means acquires, from the second bird's-eye images, the second overhead image which can be regarded as the same road surface area as that of the first overhead image for each of inclination in the longitudinal direction of the moving body in each of moving directions of the moving body assumed in advance, and
said moving-state change calculating means compares the similarity degrees between the first overhead image and each of the plurality of second overhead images to each other to identify the second overhead image with the largest similarity degree, and determines the moving direction and the inclination of the moving body based on which the identified second overhead image is obtained as the most probable change in the moving state of the moving body.

6. The moving-state determining device according to claim 5,
wherein homography $H_N$ which is used for obtaining the second overhead image is acquired by the following equation with the inclination of the moving body in the longitudinal direction as a pitch angle $\varphi$:

$$H_N = A \begin{pmatrix} \cos\theta & \sin\theta & L\sin\theta \\ -\sin(\phi+\varphi)\sin\theta & \sin(\phi+\varphi)\cos\theta & h\cos(\phi+\varphi) + L\cos\theta\sin\phi \\ -\cos\phi(\phi+\varphi)\sin\theta & \cos(\phi+\varphi)\cos\theta & h\sin(\phi+\varphi) + L\cos\theta\cos\phi \end{pmatrix}.$$

7. The moving-state determining device according to claim 6,
wherein said moving body is a vehicle,
said camera picks up a road image in front of the vehicle in the moving direction of the vehicle, and
said moving-state determining device further comprises lateral displacement amount calculating means for calculating a lateral displacement amount with respect to the moving direction of the vehicle based on the most probable change in the moving state of the vehicle acquired by the moving-state change calculating means,
wherein said running-state determining device extracts the lateral displacement amount corresponding to drop in attention of a driver of the vehicle from the lateral displacement amount calculated by the lateral displacement amount calculating means and uses the extracted lateral displacement amount for detecting meandering of the vehicle.

8. The moving-state determining device according to claim 6,
wherein said moving body is a vehicle, and
said moving-state determining device further comprises illumination direction adjusting means for adjusting an illumination direction of a headlight of the vehicle based on the pitch angle $\varphi$.

9. The moving-state determining device according to claim 1,
wherein said moving body is a vehicle, and
said moving-state determining device further comprises:
lateral displacement amount calculating means for calculating a lateral displacement amount with respect to the moving direction of the vehicle based on the most probable change in the moving state of the vehicle acquired by the traveling-state change calculating means, the lateral displacement amount calculating means extracting the lateral displacement amount corresponding to a curve of a road on which the vehicle is moving based on temporal change of the lateral displacement amount and estimating the direction of the curve based on the extracted lateral displacement amount; and
illumination direction adjusting means for adjusting an illumination direction of a headlight of the vehicle based on the direction of the curve estimated by the lateral displacement amount calculating means.

* * * * *